(12) United States Patent
Stanford

(10) Patent No.: US 9,681,613 B2
(45) Date of Patent: Jun. 20, 2017

(54) WATER-LEVEL INDICATOR AND WIDE-MOUTH RE-FILL APPARATUS FOR SUB-IRRIGATED, CONTAINERIZED PLANTS THAT ATTACHES TO A PLANT'S GROWPOT

(71) Applicant: Steven C. Stanford, Tampa, FL (US)

(72) Inventor: Steven C. Stanford, Tampa, FL (US)

(*) Notice: Subject to any disclaimer, the term of this patent is extended or adjusted under 35 U.S.C. 154(b) by 189 days.

(21) Appl. No.: 14/492,280

(22) Filed: Sep. 22, 2014

(65) Prior Publication Data

US 2015/0083246 A1    Mar. 26, 2015

Related U.S. Application Data

(60) Provisional application No. 61/881,050, filed on Sep. 23, 2013.

(51) Int. Cl.
*A01G 27/02* (2006.01)
*A01G 27/00* (2006.01)
*A01G 27/04* (2006.01)

(52) U.S. Cl.
CPC ......... *A01G 27/008* (2013.01); *A01G 27/003* (2013.01); *A01G 27/005* (2013.01); *A01G 27/02* (2013.01); *A01G 27/04* (2013.01); *Y10T 137/8342* (2015.04)

(58) Field of Classification Search
CPC .... A01G 29/00; A01G 27/006; A01G 27/005; A01G 27/003; A01G 27/00; A01G 27/02; A01G 27/04; A01G 27/008; Y10T 137/189; A47G 2033/1286; A47G 33/12

USPC .................................................. 47/48.5, 79
See application file for complete search history.

(56) References Cited

U.S. PATENT DOCUMENTS

| | | | |
|---|---|---|---|
| 3,483,656 A * | 12/1969 | Baumann | A01G 27/008 137/558 |
| 3,534,498 A | 10/1970 | Herrli | |
| 3,630,083 A * | 12/1971 | Gorans | B01D 23/28 73/294 |
| 3,926,143 A * | 12/1975 | Hothan | G01F 23/58 116/228 |
| 3,988,857 A * | 11/1976 | Baumann | A01G 27/008 116/228 |
| 4,219,967 A | 9/1980 | Hickerson | |
| 4,270,309 A * | 6/1981 | Baumann | A01G 27/008 47/59 R |
| 4,663,884 A * | 5/1987 | Zeischegg | A01G 27/008 47/48.5 |
| 4,916,858 A * | 4/1990 | Hobson | A01G 27/04 47/81 |
| 4,962,613 A | 10/1990 | Nalbandian | |
| 4,996,792 A | 3/1991 | Holtkamp, Sr. | |

(Continued)

FOREIGN PATENT DOCUMENTS

DE        102013005889 A1 * 10/2013 .............. A01G 7/008

*Primary Examiner* — David Parsley
(74) *Attorney, Agent, or Firm* — GrayRobinson, P.A.

(57) ABSTRACT

A water-level indicator and re-fill apparatus for the sub-irrigation of potted plants. The indicator uses a float and shaft placed inside an outer tube attached to a potted plant as a way to visually indicate to the user when the reservoir of the sub-irrigation system is running low. While attached to the plant, the user may conveniently re-fill the apparatus after being notified of the water level without disassembling the apparatus or removing it from a decorative planter.

20 Claims, 7 Drawing Sheets

(56) References Cited

U.S. PATENT DOCUMENTS

| | | | |
|---|---|---|---|
| 5,491,929 A | 2/1996 | Peacock et al. | |
| 5,799,437 A | 9/1998 | Evans et al. | |
| 5,956,899 A | 9/1999 | DiOrio | |
| 6,237,283 B1 | 5/2001 | Nalbandian et al. | |
| 6,345,470 B1 * | 2/2002 | Slaght | A01G 27/02 47/79 |
| 6,662,493 B1 * | 12/2003 | Bathey | A01G 29/00 47/48.5 |
| 6,848,483 B1 * | 2/2005 | Atkinson | A01G 27/02 137/393 |
| 8,146,292 B2 * | 4/2012 | Brandstatter | A01G 27/02 47/79 |
| 8,408,229 B2 | 4/2013 | Goldberg et al. | |
| 8,973,301 B2 * | 3/2015 | Leung | A01G 27/02 47/48.5 |
| 2008/0302002 A1 * | 12/2008 | Schmidt | A01G 25/167 47/48.5 |
| 2010/0064581 A1 * | 3/2010 | Johnson | A01G 25/167 47/79 |
| 2010/0147865 A1 * | 6/2010 | Yang | B65F 1/04 220/810 |

\* cited by examiner

WATER-LEVEL INDICATOR AND WIDE-MOUTH RE-FILL APPARATUS FOR SUB-IRRIGATED, CONTAINERIZED PLANTS THAT ATTACHES TO A PLANT'S GROWPOT

CROSS-REFERENCE TO RELATED INVENTIONS

This application claims the benefit under 35 U.S.C. §119(e) of provisional application No. 61/881,050, filed Sep. 23, 2013, the disclosure of which is hereby incorporated by reference herein.

BACKGROUND OF THE INVENTION

Field of the Invention

This invention relates to potted plants. More particularly, this invention relates to the irrigation of potted plants.

Description of the Background Art

Many people have plants around the house that need constant watering. Most owners water their plants on a schedule or when the plant seems dried out. However, that may be too late in the case of sensitive plants or busy owners. The conventional method of "watering when you remember" is not an efficient method to keep a houseplant alive. Conversely, many plant owners over water their plants by flooding them with too much water, leading to rotted roots. Also, from a safety point of view, water and electricity are generally not a good mix and having a re-fill indicator dependent on a power source could lead to safety issues. A new apparatus is needed to help owners with irrigating their plants and at the same time indicating to owners when more water is needed for irrigation without the need for a power source.

Different methods have been found to essentially self-irrigate potted plants using water reservoirs so that daily watering is unnecessary. However, previous methods have not been able to alert the plant owner when the reservoir has run dry and needs re-filling without resorting to an external power source. The present invention seeks to fill that need.

Presently, plant enthusiasts use a capillary "wicking" material to draw water from a reservoir and into a plant's root system. The user fills the reservoir with water to feed the plant which draws up the water through the wicks using capillary motion. This system, once attached to the potted plant, does not allow for the user to actively ascertain the amount of water left in the reservoir and is currently viewed as inadequate. Some existing publications relating to sub-irrigation systems featuring a reservoir will now be discussed.

For example, U.S. Pat. No. 6,237,283 to Nalbandian discloses a linked sub-irrigation reservoir system. The system contains a reservoir with a plurality of holes for drainage, air exchange, and absorption. However, the system is generally found underneath the desired plant and requires the use of a dipstick to determine the remaining liquid in the reservoir.

U.S. Pat. No. 8,408,229 to Goldberg et al. discloses a device for automatically watering plants with a cavity for receiving plants operated by a microcontroller. Goldberg generally requires a power source for the microcontroller to determine the remaining liquid in the reservoir, among other features.

U.S. Pat. No. 5,956,899 to DiOrio discloses a self-watering plant device with a sensor based on the plant's water need. The sensor is placed in various depths depending on the type of plant to prevent excessive watering. The sensor determines when water enters the plants root system. The device requires a power source to power the sensor and does not take into account the depth of remaining water in the reservoir.

Another design is shown in U.S. Pat. No. 5,491,929 to Peacock et al. regarding a storage container for a houseplant. The container is fully enclosed and contains a wick so that the plant may continue to be watered during transport or storage. The user of the device has no way of knowing how much water remains in the reservoir without dismantling the device. Similarly, U.S. Pat. No. 4,962,613 to Nalbandian et al. relates to a plant growing system with a reservoir and a plurality of holes to allow for oxygen transfer as well as a tube for water/oxygen flow. Again, this device has no way of determining the amount of water remaining in the reservoir without dismantling the entire system.

U.S. Pat. No. 4,996,792 to Holtkamp, Sr. describes a plant watering container with a wick and reservoir. The container calls for a pot containing a plant to be lowered into it and is meant for small potted plants. The container in Holtkamp does not allow for the aesthetic features of the potted plant to remain completely visible when the potted plant is placed into the device.

U.S. Pat. No. 4,219,967 to Hickerson describes a flower pot watering apparatus. The apparatus contains a liquid reservoir system and an opening for adding water to the system which is always open to the air. Again, the system has no way to determine the amount of water remaining in the system.

U.S. Pat. No. 3,534,498 to Herrli describes an installation for plants. The system is basically a 2-pot system with a wick to deliver water to the plant. The system has a plurality of openings along the top to allow for the passage of oxygen into the system. There is no disclosed way to determine the water level remaining inside the device at any given time.

A different type of system is found in U.S. Pat. No. 5,799,437 to Evans et al. The system described therein is for cut plants like Christmas trees and the primary object of the system is to fill cut plant stands and to provide a way to alert the user that the stand has reached the desired filled level. Evans does not provide a way to alert the user that the stand has reached the undesired "empty" level but rather alerts the user only when the amount of liquid in the system has reached a pre-determined "full" level.

These predecessor systems have yet to provide a simple mechanical method to determine when an auto-irrigation system has run low on water in the reservoir without resorting to electronics.

Therefore, it is an object of this invention to provide an improvement which overcomes the aforementioned inadequacies of the prior art devices and provides an improvement which is a significant contribution to the advancement of plant irrigation art.

Another object of this invention is to provide an aesthetically pleasing self-irrigating watering system.

A further object of this invention is to help enhance the longevity of potted plants so that they may remain personally and commercially viable.

Yet another object of this invention is to provide an watering system that will support a longer watering interval for potted plants.

Another object of this invention is to provide a water level indicator and refill apparatus comprising an outer tube having an upper end and a lower end with said upper end having an opening and said lower end having a lower cap with a plurality of drainage slots, a water-level indicator cap having a closed end and an open end, having a dome on said closed end, which is mechanically attached to said outer tube, a shaft having a first end and a second end extending longitudinally through said outer tube, a float attached to said shaft by a receiving slot and a clamping, clasping, or grasping system mechanically attached to said outer tube for securing said outer tube to said potted plant.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a sub-irrigation watering system for potted plants with a mechanical visual indicator to alert the user to a low water level in the reservoir and ability to refill without having to dismantle the watering system. There is a great need for a sub-irrigation system which easily, reliably, and simply indicates to the user that the reservoir of water providing sustenance to the potted plant has run low without having to dismantle the watering system or remove the plant from the container.

In accordance with one preferred embodiment, there is provided a sub-irrigation watering system for watering a plant at regular intervals, said sub-irrigation watering system comprising: an outer tube having a lid, a clamping means to attach the outer tube to the plant's pot, a plurality of drainage slots on the lower end to allow water into the base, and a shaft having a first end and second end attached to a moveable float to indicate water level with the shaft itself having a height slightly longer than the outer tube, extending slightly past the top of the outer tube to provide visibility. The benefit of this aspect is that the owner of the plant will have a simple and reliable way to determine if the reservoir needs to be refilled.

In accordance with another embodiment, there is provided a water-level indicator for easily indicating a low water level, said water-level indicator comprising: a shaft which is a length of material whose length is slightly longer than the outer tube, preferably plastic or another lightweight material; a float made out of a non-absorbent material which floats in water; a molded tab with an aperture to guide the shaft into the water-level indicator cap; and a plastic cap having an open and closed end to indicate the desired amount of water in the system, preferably transparent or translucent. The water-level indicator cap would preferably have some sort of indicia on it to indicate to the user different levels of liquid inside the reservoir.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
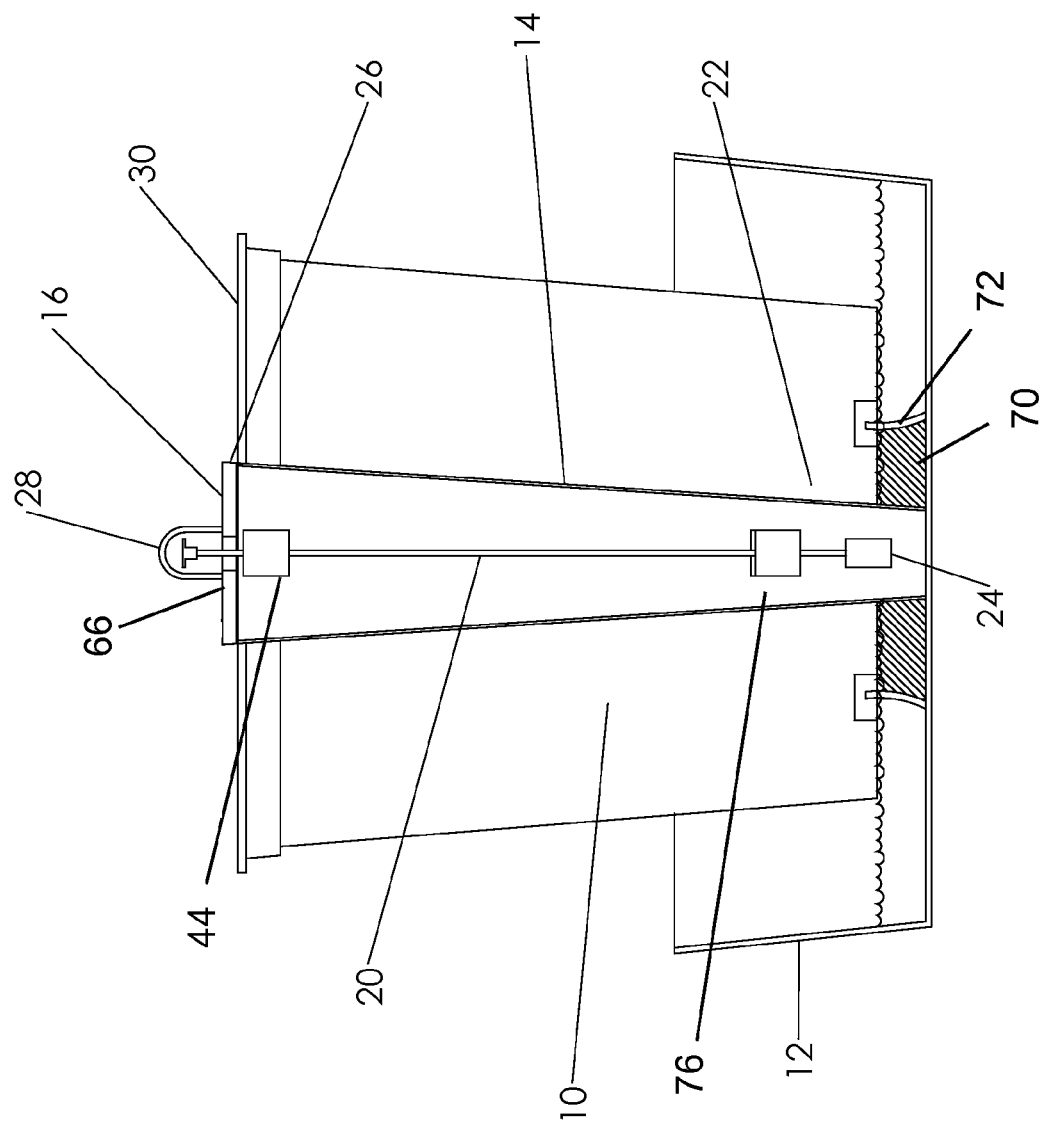
FIG. 1 is an partial cross-sectional view of the sub-irrigation watering system attached to a potted plant.

FIG. 1 shows a partial cross-sectional view wherein the inside of the outer shell 12 is shown to better view the front of the refill apparatus 10 with an outer tube 14. When the refill apparatus 10 is attached to a potted plant 30, the combination sits in the outer shell 12 on top of a riser 70. A plurality of wicks 72 are inserted into the potted plant 30 before the potted plant 30 is placed inside the outer shell 12. When the refill apparatus 10 and the potted plant 30 are in the outer shell 12, the wicks 72 will receive water from the refill apparatus 10 and then feed the potted plant 30 via capillary action. Preferably, the outer shell 12 is made of vinyl or other impermeable fabric to prevent leaks.

Preferably the outer tube 14 is a semicircular frustroconical canal and tapered from top to bottom such that an upper end 26 is at least twice as large as lower end 22. Inside outer tube 14 is a shaft 20 which attaches to a float 24. The shaft 20 is similar to a straw in that it is circular and cylindrical. The shaft 20 has a length that is slightly longer than the overall length of the outer tube 14. The shaft 20 is kept in position using a standoff 76. The shaft 20 is preferably slightly taller than outer tube 14. The outer tube 14 is attached to potted plant 30 and lowered into outer shell 12. The length of outer tube 14 is preferably slightly longer than the potted plant's 30 height.

It should be noted that the shaft 20 inside the water-level indicator cap 28 varies in position depending on liquid level. The water-level indicator cap 28 is circular and cylindrical having a dome. The water-level indicator cap 28 preferably has indicia 62 to indicate to the user the amount of liquid in the refill apparatus 10. The water-level indicator cap 28 should be translucent and is preferably transparent. The float 24 is preferably placed on the shaft 20 at the lower end 22 of outer tube 14 such that, when the desired amount of water is present in the reservoir, float 24 will raise the shaft 20 into such a position that the user will see the shaft 20 reach the desired level in the water-level indicator cap 28. The water-level indicator cap 28 will have indicia 62 to indicate to the user that they have reached the desired amount of liquid in the system. Preferably, the maximum amount of water in the system is the same height as the riser 70 in order to prevent overwatering of the potted plant 30. Overwatering is prevented by having the shaft 20 inside the water-level indicator cap 28 indicate to the user that the refill apparatus 10 is at its maximum desired level.

Figure 2:
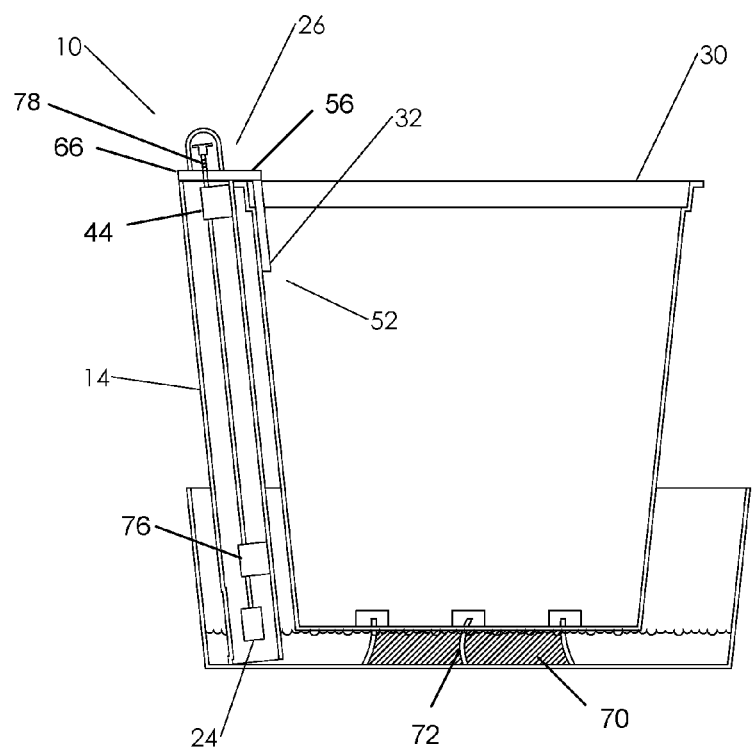
FIG. 2 is a diametrical cross-sectional view of the sub-irrigation watering system attached to a potted plant.

FIG. 2 shows a cross-sectional view of the side of the refill apparatus 10. The outer tube 14 is attached to the potted plant 30 by a clamping system 32 secured to the upper end 26 of the outer tube 14. The clamping system 32, in this view, is comprised of upper arm 56 and outer arm 52, which are preferably made of spring steel, which provide the tensile support for the refill apparatus 10 to attach to potted plant 30. Alternatively, the outer tube 14 may be attached to the potted plant 30 by a bracket or other means.

Figure 3:
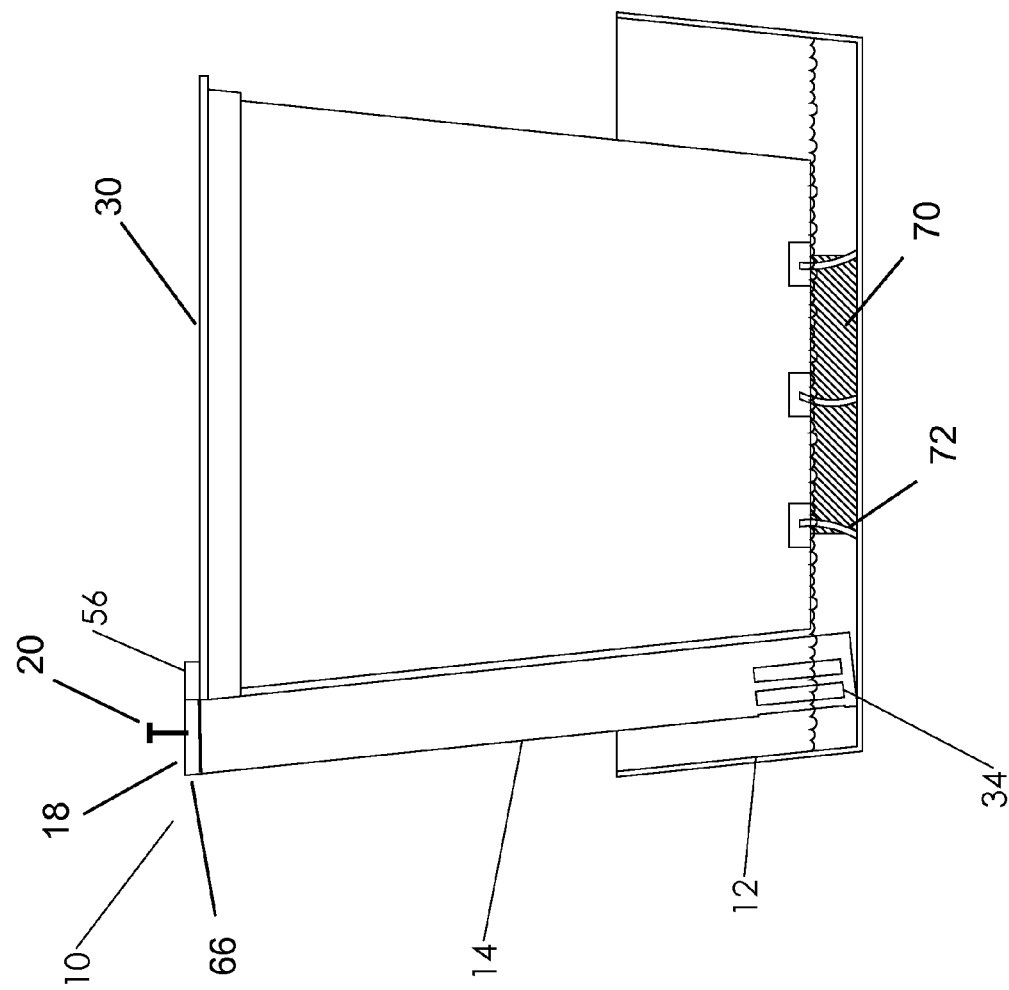
FIG. 3 is a partial cross-sectional view of the side of the sub-irrigation watering system attached to a potted plant.

FIG. 3 is a partial cross-sectional view of the side of the refill apparatus 10 showing the inside of the outer shell 12 in order to get a better view of the refill apparatus 10. This view better shows the drainage slots 34 which allow liquid to flow out of outer tube 14 and into outer shell 12 to form a reservoir. The drainage slots 34 are preferably rectilinear in shape travelling lengthwise along the outer tube 14 for a length slightly taller than the preferred height of the reservoir which is generally the height of the riser 70 but may be higher. There should be a plurality of drainage slots 34 so that the liquid within the refill apparatus 10 does not flood out of the system and shock the potted plant 30 or rot the potted plant's 30 roots.

This figure also features an alternative embodiment of the invention which does not have the water-level indicator cap 28 and instead uses the shaft 20 with indicia 78 (as shown in FIG. 2) on it open to the air to indicate to the user when to refill the refill apparatus 10. Indicia on the shaft 20 serve substantially the same purpose as indicia on the water-level indicator cap. Additionally for the alternative embodiment, the lid 16 will have an opening 18 which will allow the user to pour directly into the outer tube 14 instead of opening the lid 16.

Figure 4B:
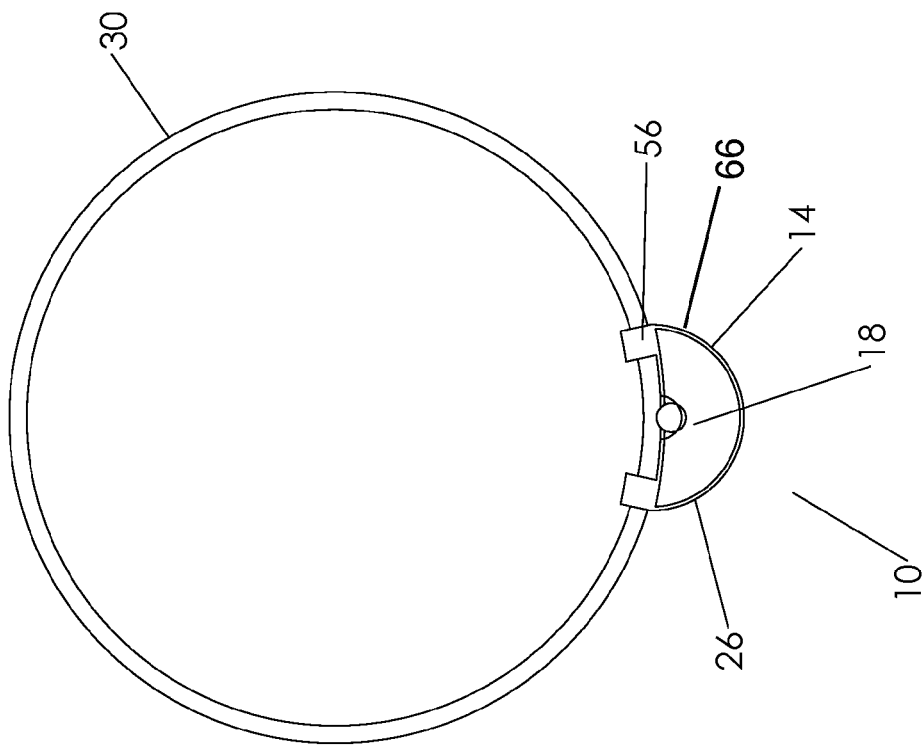
FIG. 4B is a top perspective view of the sub-irrigation watering system attached to a potted plant.
Figure 4A:
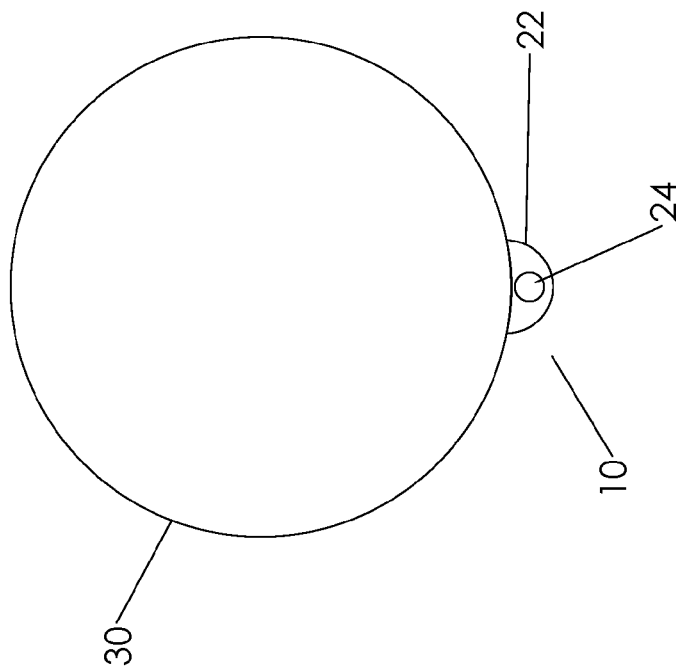
FIG. 4A is a bottom perspective view of the sub-irrigation watering system attached to a potted plant.

FIGS. 4A & 4B represent perspective views of the bottom and top views respectively of the refill apparatus 10 attached to the potted plant 30. Lower end 22 is preferably the same curvature as potted plant 30, as shown in FIG. 4A. Similarly, upper end 26 is preferably the same curvature as potted plant 30, as shown in FIG. 4B. A comparison of FIG. 4A with FIG. 4B shows the tapering of outer tube 14 and that the relative size of upper end 26 is preferably twice as wide as lower end 22. When liquid level is at a minimum, float 24 rests at the lower end 22 of the outer tube 14.

Figure 5:
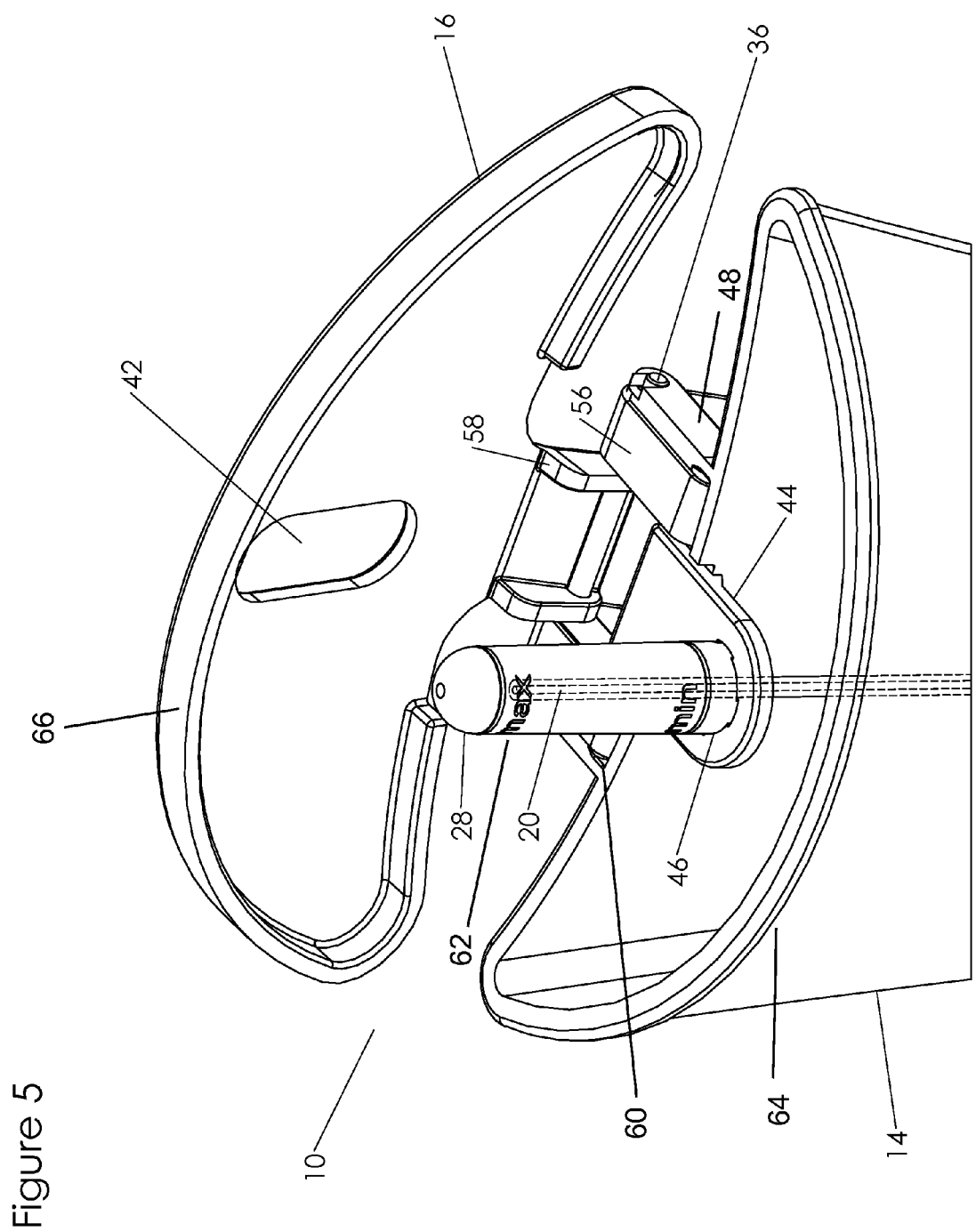
FIG. 5 is a perspective view of the top of outer tube of the sub-irrigation watering system showing the lid in the open position.

FIG. 5 is a perspective view of the top of outer tube 14 of the refill apparatus 10 showing the lid 16 in the "open" position and the water-level indicator cap 28 in position. Outer tube 14 has a lid 16 to allow for the pouring of water into the outer tube 14 when in the "open" position. Preferably, the lid 16 is connected by a hinge system. The lid 16 has upper leaves 58 molded into its shape and is lowered into the lower leaves 48, which are molded into the shape of outer tube 14, and connected by the hinge pin 36, creating a hinge system. Preferably, the lower leaves 48 comprise a U-shape.

The lid 16 has a molded upper lip 66 which, when in the closed position, rests on top of lower lip 64, which is molded into outer tube 14. While the lid 16 is in the open position, the user is able to pour water into the outer tube 14. There is a lid opening 42 in the lid 16 so that the water-level indicator cap 28 does not interfere with the opening and closing of the lid 16. As water is poured into the outer tube 14, the shaft 20 will rise in the water-level indicator cap 28 until it reaches the desired level as noted by indicia 62. Similarly, as water is used by the potted plant 30, the water level in the sub-irrigation watering system drops, dropping the height of the shaft 20 below the desired level. This allows the user to effectively see in real time what level of water is in the refill apparatus 10 at any time.

Figure 6:
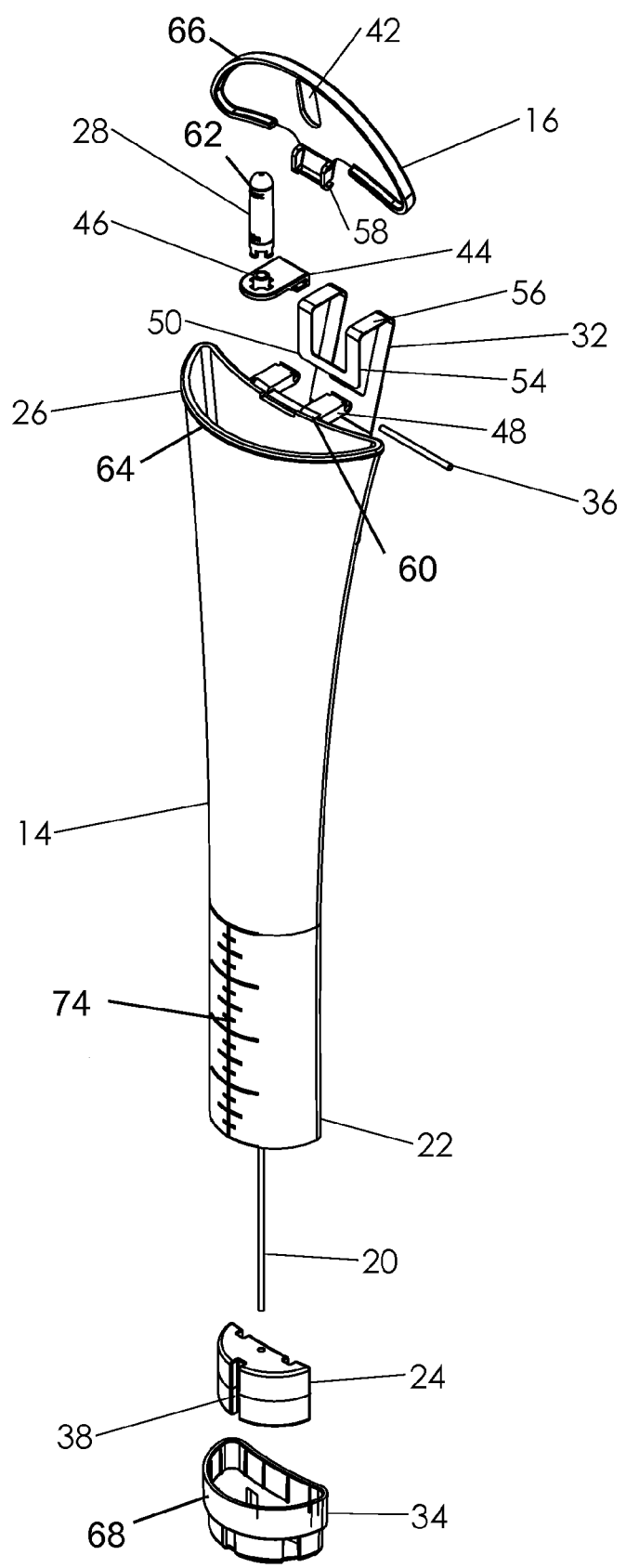
FIG. 6 is an exploded view of the outer tube portion of the sub-irrigation watering system.

FIG. 6 shows an exploded view of the refill apparatus 10. This portion of the refill apparatus 10 comprises a lid 16 which is connected to the upper end 26 of outer tube 14 via a hinge pin 36. The connection is made by attaching the lid 16 to the lower leaves 48 of outer tube 14 creating a hinge. The hinge pin 36 also attaches the clamping system 32. The clamping system 32 is preferably made of spring steel and comprises a middle arm 50, an outer arm 52, inner arm 54, and upper arm 56. The middle arm 50 and the inner arm 54 fits into a slot 60 molded into the lower leaves 48. Once inside the slot 60, the clamping system 32 is kept in place by the hinge pin 36.

The shaft 20 can be seen extending for the entire length of the outer tube 14 and fitting into a receiving slot 38 properly positioned in float 24. A plurality of drainage slots 34 can be seen on lower end 22 of outer tube 14 which provides an exit for any liquid poured into outer tube 14. The drainage slots 34 are molded into a lower cap 68. The outer tube 14 preferably fits into the lower cap 68 like a sleeve. An alternative embodiment can also be seen here with outer tube 14 having tube indicia 74 of its own as a way for the user to size the outer tube 14 such that the outer tube 14 matches the size of the potted plant 30.

The water-level indicator cap 28 is attached to the outer tube 14 by a molded tab 44 with an aperture 46 which clips onto the lower lip 64 near the lower leaves 48 of the outer tube 14. A molded tab 44 extends into the center of outer tube 14 such that the shaft 20 enters the aperture 46 of the molded tab 44. The molded tab 44 clips centrally onto outer tube 14 at the upper end 26 between the lower leaves 48 of the hinge system. The attachment between the water-level indicator cap 28 and outer tube 14 is mechanical and can be made in any number of known ways. Preferably, the water-level indicator cap 28 is attached in a snap-button fashion but may also be attached by screwing, bracketing, bolting, or fastening the water-level indicator cap 28 onto the aperture 46 of the molded tab 44. When the lid 16 is shut during operation, the water-level indicator cap 28 will preferably protrude from the upper end 26 of the outer tube 14 through the lid opening 42.

Preferably, the attachment point for the shaft 20 and the float 24 is a receiving slot 38 having substantially the same shape as the shaft 20 such that the shaft 20 snaps into place and remains physically attached to the float 24. The float 24 is substantially the same shape as outer tube 14. The float 24 provides buoyancy for the shaft 20 when connected and allows the shaft 20 to indicate to the user that the system needs refilling.

Figure 7:
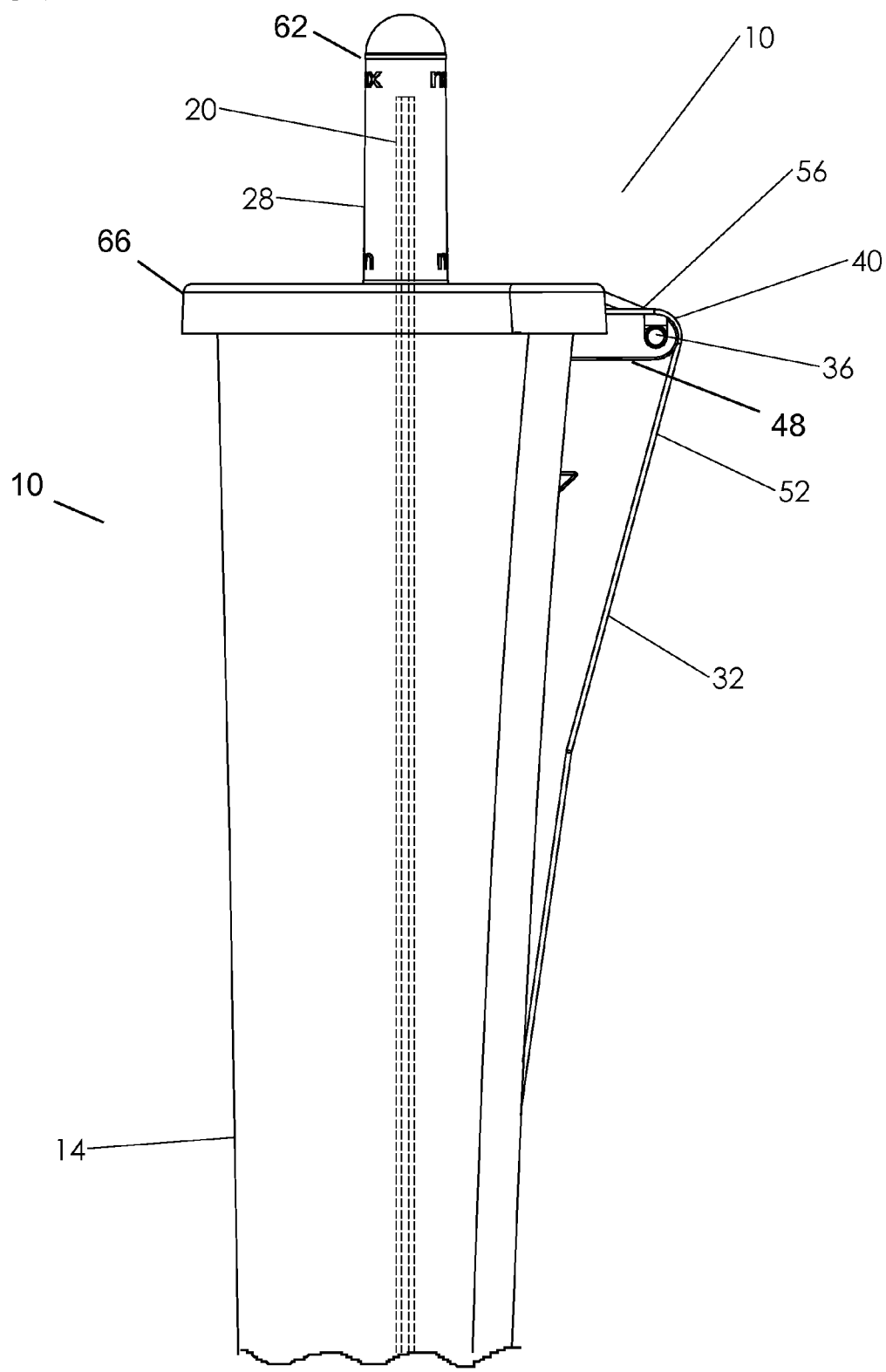
FIG. 7 is a partial side perspective view of the sub-irrigation watering system to a potted plant with a transparent outer tube and water-level indicator to make the shaft visible.

FIG. 7 is a partial side perspective view of the refill apparatus 10, not including the lower half. The preferred embodiment of the clamping system attaches the refill apparatus 10 to the potted plant 30 by placing the outer arm 52 on the inner wall of the pot of the potted plant 30 using the natural tension created by the extension of the outer arm 52 comprising a metal like spring steel. An alternative embodiment of the refill apparatus 10 uses a spring 40 to provide the tension needed for the clamping system 32 to keep the outer tube 14 attached to the potted plant 30 if another material like plastic is used for the clamping system 32. Another alternative embodiment may use a bracket to hook onto the outer portion of the potted plant 30.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A water-level indicator and refill apparatus for potted plants comprising:
    a lid having an upper lip and two lower leaves for forming a hinge system;
    an outer tube having:
        an upper end and a lower end with said upper end having an opening and lower lip and said lower end having a lower cap;
        two lower leaves to the hinge system in a U-shape molded into said upper end;
        a molded tab clipped centrally between the two leaves of the hinge system having an aperture and extending laterally into the outer tube;
        a plurality of drainage slots located on said lower cap of said outer tube to provide a point of egress for liquid within the apparatus;
        the hinge system where the upper leaves on the lid slide together with the lower leaves molded into the upper end of said outer tube and connected with a hinge pin;
    a water-level indicator cap having a closed end and an open end, having a dome on said closed end, which is mechanically attached to said molded tab;
    a shaft having a first end and a second end extending longitudinally through said outer tube, said shaft having a length longer than the length of said outer tube, wherein said shaft extends through said aperture of said molded tab and through said open end of said water-level indicator cap to a length just beneath the dome of said water-level indicator cap when liquid level in the apparatus is at a maximum and wherein said shaft extends to a length just beyond the open end of said water-level indicator cap when liquid level is at a minimum;
    a float attached to said shaft by a receiving slot; and
    a clamping system having two outer arms, two upper arms, two inner arms, and a connecting arm attached to said outer tube secured in a slot molded into the upper end of said outer tube and kept in place by the hinge pin.

2. The water-level indicator and refill apparatus of claim 1 wherein said outer tube is a semicircular frustroconical canal.

3. The water-level indicator and refill apparatus of claim 2 wherein said outer tube has a height matching the potted plant to which it is attached.

4. The water-level indicator and refill apparatus of claim 1 wherein said shaft is guided through said outer tube by a standoff.

5. The water-level indicator and refill apparatus of claim 1 wherein said water-level indicator cap protrudes through said opening in said upper end of said outer tube.

6. The water-level indicator and refill apparatus of claim 1 wherein said water-level indicator cap is translucent.

7. The water-level indicator and refill apparatus of claim 1 wherein said water-level indicator cap is transparent.

8. The water-level indicator and refill apparatus of claim 1 wherein said water-level is a circular cylinder.

9. The water-level indicator and refill apparatus of claim 1 wherein said water-level indicator cap has indicia.

10. The water-level indicator and refill apparatus of claim 1 wherein said float is semicircular in shape.

11. The water-level indicator and refill apparatus of claim 1 wherein said clamping system is made of spring steel.

12. The water-level indicator and refill apparatus of claim 1 wherein said drainage slots are rectilinear.

13. The water-level indicator and refill apparatus of claim 1 wherein said outer tube has tube indicia.

14. A water-level indicator and refill apparatus for potted plants comprising:
    a lid having an upper lip and two lower leaves for forming a hinge system;
    an outer tube with having:
        an upper end and a lower end with said upper end having an opening and lower lip and said lower end having a lower cap;
        two lower leaves to a hinge system in a U-shape molded into said upper end;
        a molded tab clipped centrally between the two leaves of the hinge system having an aperture and extending laterally into the outer tube;
        a plurality of drainage slots located on said lower cap of said outer tube to provide a point of egress for liquid within the apparatus;
    a hinge system where the upper leaves on the lid slide together with the lower leaves molded into the outer tube and connected with a hinge pin;
    a shaft having a first end and a second end extending longitudinally throughout said outer tube, said shaft having a length longer than the length of said outer tube, wherein said shaft extends through said aperture of said molded tab and through said opening of said outer tube to a length beyond the upper end of said outer tube when liquid level in the apparatus is at a maximum and wherein said shaft extends to the same length of said outer tube when liquid level is at a minimum;
    a float attached to said shaft by a receiving slot; and
    a clamping system having two outer arms, two upper arms, two inner arms, and a connecting arm attached to said outer tube secured in a slot molded into the upper end of said outer tube and kept in place by the hinge pin.

15. The water-level indicator and refill apparatus of claim 14 wherein said outer tube is a semicircular frustroconical canal.

16. The water-level indicator and refill apparatus of claim 14 wherein said float is semicircular in shape.

17. The water-level indicator and refill apparatus of claim 14 wherein said clamping system is made of spring steel.

18. The water-level indicator and refill apparatus of claim 14 wherein said drainage slots are rectilinear.

19. The water-level indicator and refill apparatus of claim 14 wherein said shaft contains indicia.

20. The water-level indicator and refill apparatus of claim 14 wherein said outer tube has tube indicia.

* * * * *